G. E. RUDNICK.

DROP COVER CHECK.

APPLICATION FILED MAR. 13, 1922.

Reissued May 9, 1922.

15,350.

2 SHEETS—SHEET 1.

INVENTOR

George E. Rudnick,

BY Blount, Moulton & Kelley

ATTORNEYS

WITNESS

F. J. Hartman.

G. E. RUDNICK.

DROP COVER CHECK.

APPLICATION FILED MAR. 13, 1922.

Reissued May 9, 1922.

15,350.

2 SHEETS—SHEET 2.

INVENTOR

George E. Rudnick.

BY Blount, Moulton & Neikes

ATTORNEYS

WITNESS

F. J. Hartman.

UNITED STATES PATENT OFFICE.

GEORGE E. RUDNICK, OF BOSTON, MASSACHUSETTS, ASSIGNOR TO VICTOR TALKING MACHINE COMPANY, OF CAMDEN, NEW JERSEY, A CORPORATION OF NEW JERSEY.

DROP-COVER CHECK.

15,350. Specification of Reissued Letters Patent. Reissued May 9, 1922.

Original No. 1,333,939, dated March 16, 1920, Serial No. 283,320, filed March 18, 1919. Application for reissue filed March 13, 1922. Serial No. 543,512.

*To all whom it may concern:*

Be it known that I, GEORGE E. RUDNICK, a citizen of the United States, and a resident of Roxbury, Boston, county of Suffolk, and Commonwealth of Massachusetts, have invented an Improvement in Drop-Cover Checks, of which the following description, in connection with the accompanying drawings, is a specification, like characters on the drawings representing like parts.

The invention relates to cover supporting and checking means for retaining in open position, and checking or controlling the closing action of a top or cover for talking machines, music boxes and similar cabinets.

Figure 1:
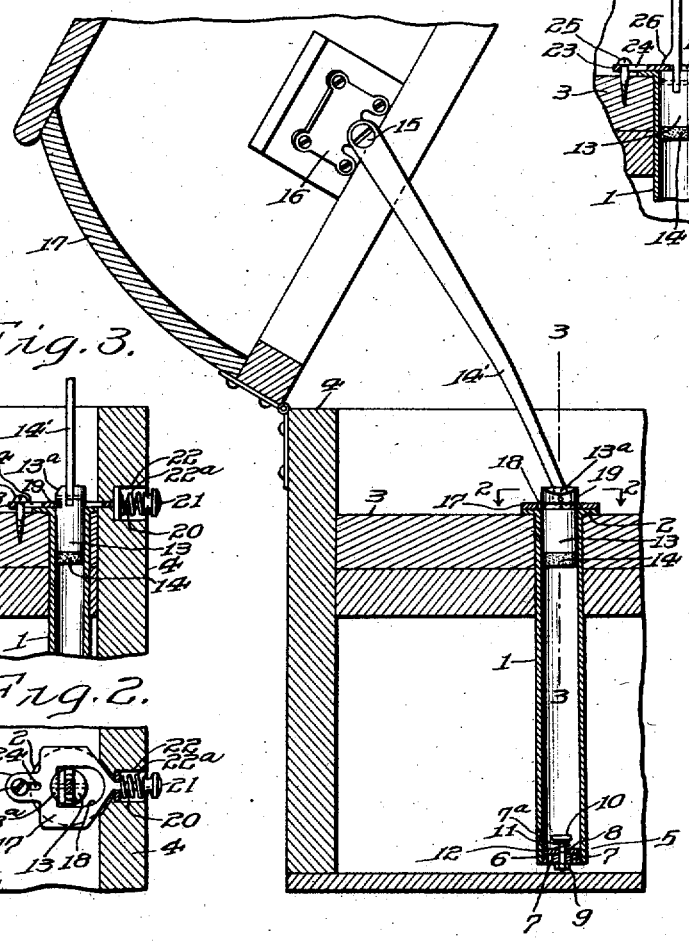
Figure 4:
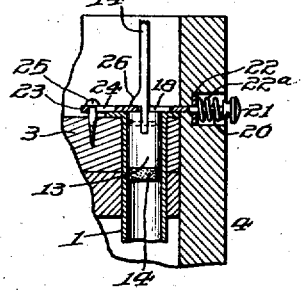
Figure 3:
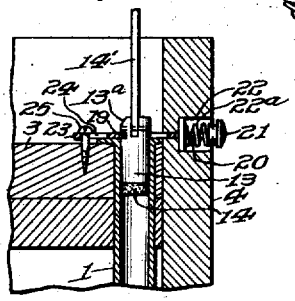
Figure 2:
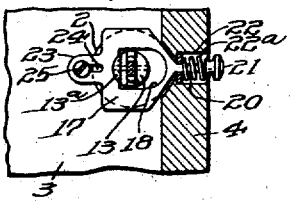
Figure 5:
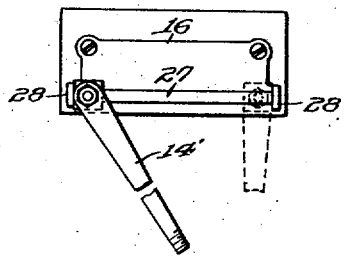
Figure 7:
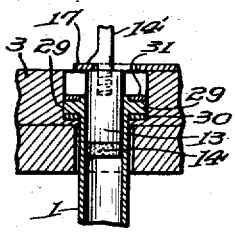
Figure 6:
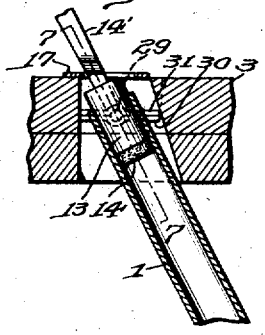

In the drawings of the embodiment of my invention selected for illustration and description, Figure 1 is a vertical sectional view of a conventional form of talking machine cabinet with my novel cover check in position thereon;

Fig. 2, a detail plan and partial section on the line 2—2 Fig. 1;

Fig. 3, a partial sectional view on the line 3—3 Fig. 1;

Fig. 4, a similar view of a modified form of construction;

Fig. 5, a detail of a modified form of construction of the hinge for the supporting rod;

Fig. 6, a detail of a modified form of the cylinder construction;

Fig. 7, a vertical section on the line 7—7 Fig. 6, and

Figure 8:
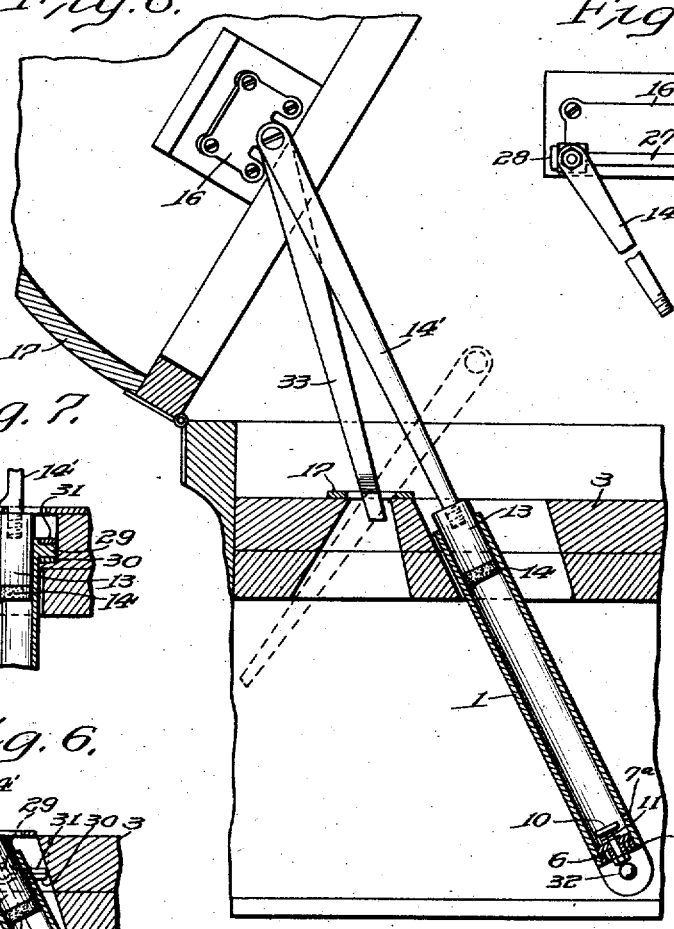

Fig. 8, a modified form of cylinder and supporting rod construction.

My novel check comprises, Figs. 1, 2, 3, a cylinder 1 of suitable material as metal, with a flange 2, suitably mounted on the shelf 3 of the cabinet 4. This cylinder is provided at or near its lower end with an air valve 5, comprising a seat 6 with ports 7 therethrough, and a stud 8.

This stud may be secured by a nut 9 on its lower end and it carries a head 10 at its opposite end. Beneath the head and seated against it is a spiral spring 11 which acts to press down upon a disk 12 preferably of flexible material as leather, and thereby cause it to normally close the ports 7. The cylinder may also have a port $7^a$ if desired although it is not necessary.

In its opposite and upper end the cylinder carries a plunger 13 of any suitable material as metal with a washer 14 as of leather. To the end of the plunger Fig. 1, is pivoted or otherwise loosely connected a cover supporting rod 14′, the upper end of which is movably connected, as by a screw 15, to a hinge or plate member 16, secured as by screws to the cover 17. In this case the member 14′ is bent to enable it to clear the edge of the cylinder 1, as it descends.

For retaining the plunger 13 and rod 14′ in elevated position I provide a novel catch Figs. 2, 3, comprising a plate 17 with an elongated aperture 18 therein, which receives the plunger 13. When the plunger is in raised position Fig. 1, the straight edge of the aperture 18 rests within a slot 19 in the side of the plunger and thereby supports it.

The catch 17 Figs. 2, 3, is provided with a shank 20 which extends through the side of the cabinet 4 and carries a knob 21 at its end. Between the knob 21 and the cabinet wall, and countersunk at 22 therein, is a coil spring $22^a$ acting normally to retain the plate in plunger engaging or extended position.

The catch is also provided with a neck 23 having a slot 24 through which is inserted a screw or pin 25 which acts not only to prevent lateral movement of the catch 17, but the head of the screw acts to keep the catch down adjacent the surface of the shelf 3, while permitting the desired movement thereof.

Obviously when rasing the cover and plunger the beveled edge $13^a$ of the plunger will strike the straight edge of the aperture 18 in the catch plate 17 and force the latch inwardly against the tension of the spring $22^a$, and the plunger will continue to move upwardly sliding over the said edge until the catch plate 17 registers with the slot 19 in the plunger, whereupon the spring $22^a$ will draw or snap the plate 17 into the said notch 19, thus arresting the upward travel of the plunger. It will also be obvious that after the catch plate 17 has become so seated in the said notch 19 the plunger will be prevented from descending by the engagement of the plate 17 with the notch or slot 19.

When it is desired to lower the cover, one simply pushes in on the knob 21 disengaging the catch 17 from the slot 19 and the cover will descend slowly as the air leaks out beneath the disk 12, and escapes by the port $7^a$ if the latter is provided.

In Fig. 4 is shown a modification wherein the catch 17 engages a lug 26 on the side of the rod 14′, resting between it and top of the plunger 13.

In Fig. 5 I show a modified form of hinged member. In this construction the cylinder 1 is preferably rigidly mounted in or on a cabinet shelf 3 similarly to the way in which it is shown as mounted in Figs. 1 to 4, but at an angle thereto, somewhat as is indicated in Fig. 8, the lower end of the rod 14′ being rigidly screwed or otherwise secured to the top of the plunger 13 in a manner also indicated in Fig. 8. When so constructed the upper end of the rod 14′ provided with a sliding block which is drilled to receive a rod 27 extending between the outstanding arms 28 on the member 16, whereby the rod 14′ may slide on the rod 27, as may be necessary, and the plunger may travel freely in the cylinder 1.

In Fig. 6 I have illustrated a further modification wherein the rod 14′ has a rigid connection with the plunger 13, and the cylinder 1 is pivoted at a fixed point in the cabinet by trunnions 29 which are seated in depressions in the plate 30 on the shelf 3 and which permit the cylinder to swing thereon as is necessary to accommodate the movement of the support 14′. An upper plate 31 serves to retain the trunnions in position.

In Fig. 8 I show also a further modification in which the cylinder 1 is pivotally mounted at its lower end, as by a screw 32 and the plunger also has rigid connection with the member 14′.

As the plunger descends the cylinder obviously will swing on its pivot 32 so far as is necessary to permit the cover to close.

In this case, also I show an additional supporting member 33 for the cover which may be controlled by a catch 17 as in the other instances referred to.

In all the constructions above described my invention comprises the providing of a talking machine or other cabinet, consisting of a main relatively stationary part or portion and a cover or lid forming a relatively movable part or portion, with a drop-cover check device consisting of a cylinder 1 which is mounted on or secured to one of said parts or portions, a rod 14′ mounted on or secured to the other of said parts or portions, a plunger 13 to which said rod 14′ is secured, and a catch 17 operating automatically to hold and retain said plunger at or about one limit of its motion in said cylinder with the lid or cover of the cabinet in its raised or open position.

Having thus described my invention, what I claim and desire to protect by Letters Patent is:

1. Means for checking the closing movement of a cabinet cover comprising a cylinder having a valve, a plunger in the cylinder, a catch to engage the plunger and hold it in outward position, and a supporting member connecting the plunger with the cover.

2. Means for checking the closing movement of a cabinet cover comprising a cylinder having a valve, a plunger therein, a catch comprising a support engaging plate, means normally holding the plate in plunger supporting position, and means operable from the outside of the cabinet for releasing the plunger to permit the cover to close.

3. Means for checking the closing movement of a cabinet cover comprising a cylinder having a valve, a plunger in the cylinder, a catch to engage the plunger, a plate on the cover, and a supporting member connecting the plunger slidably with the plate.

4. Means for checking the closing movement of a cabinet cover comprising a cylinder having a valve, and movably connected to the cabinet, a plunger in the cylinder, a catch to engage the plunger and a supporting member connecting the plunger with the cover.

5. Means for checking the closing movement of a cabinet cover comprising a cylinder having a valve, and movably mounted upon the cabinet, a plunger in the cylinder, a supporting member connecting the plunger with the cover, an auxiliary cover supporting member for the cover and a catch operable from the outside of the cabinet to engage the auxiliary member and support the cover.

6. Means for checking the closing movement of a cabinet cover comprising a cylinder, a valve therein, a plunger also therein, a cover supporting rod connecting the cover and plunger, and a catch on the cabinet for holding the plunger in withdrawn position and the cover open.

7. Means for checking the closing movement of a cabinet cover comprising a cylinder, a valve therein, a plunger also therein, a cover supporting rod connecting the cover and plunger, and a catch on the cabinet comprising a plate with a plunger receiving aperture, a neck on the plate extended through the cabinet wall, and a spring acting to retain the plate in locking engagement with the extended plunger to support the cover.

8. Means for checking the closing movement of a cabinet cover comprising the cabinet 4 with a shelf 3 and cover 17 thereof, a cylinder 1 mounted on the shelf, and having the valve 6, and plunger 13, the rod 14′ connecting the plunger with the cover, and a catch 17 having a plunger receiving aperture 18, adapted to engage the slot 19 in the plunger, said catch having the neck 23 with a slot 24 therein, the shank 20, spring 22ª thereon to retain the catch in extended position to support the plunger and cover.

9. Means for checking the closing movement of a cabinet cover comprising the cabinet 4 having a shelf 3 and cover 17, a cylinder 1 pivoted to said shelf adjacent its upper end, the valve 6 for the cylinder and a plunger 13 therein, the supporting rod 14′ connecting the plunger and the cover, and a catch 17 having the rod receiving aperture 18, and adapted to engage the rod 14′ to hold the rod and cover in raised position, said catch having the neck 22 and the slot 24 therein, shank 20 and spring 22ª for retaining said catch in locking engagement with the rod.

10. In a cabinet comprising a relatively stationary main or body portion and a cover or relatively movable portion the combination of a cylinder secured to one of said portions, a rod secured to the other of said portions, a plunger mounted to slide longitudinally in said cylinder and attached to said rod and a catch operating automatically to retain said plunger at substantially one limit of its longitudinal movement in said cylinder with said cover in its raised or open position.

In witness whereof, I have hereunto set my hand this 10th day of March, 1922.

GEORGE E. RUDNICK.